United States Patent [19]

Dey

[11] 4,091,188
[45] * May 23, 1978

[54] ULTRAMINIATURE HIGH ENERGY DENSITY CELL

[75] Inventor: Arabinda N. Dey, Needham, Mass.

[73] Assignee: P.R. Mallory & Co. Inc., Indianapolis, Ind.

[*] Notice: The portion of the term of this patent subsequent to Mar. 23, 1993, has been disclaimed.

[21] Appl. No.: 749,659

[22] Filed: Dec. 10, 1976

Related U.S. Application Data

[60] Division of Ser. No. 664,780, Mar. 8, 1976, Pat. No. 4,028,138, which is a continuation-in-part of Ser. No. 314,316, Dec. 12, 1972, Pat. No. 3,945,846.

[51] Int. Cl.² .............................................. H01M 2/08
[52] U.S. Cl. .................................... 429/174; 429/186; 429/194
[58] Field of Search ............... 429/174, 186, 194, 218, 429/180, 185

[56] References Cited

U.S. PATENT DOCUMENTS

| 3,475,226 | 10/1969 | Fraioli | 429/72 |
| 3,645,792 | 2/1972 | Hacha | 429/112 |
| 3,663,301 | 5/1972 | Ralston | 429/174 X |
| 3,853,627 | 12/1974 | Lehmann et al. | 429/194 |
| 3,918,992 | 11/1975 | Will et al. | 429/16 X |

Primary Examiner—Charles F. LeFevour
Attorney, Agent, or Firm—Charles W. Hoffmann; Ronald S. Cornell; Israel Nissenbaum

[57] ABSTRACT

A high energy density hermetic ultraminiature cylindrical cell containing a combination electrolyte fill port and current collector as a hollow metal needle. The cell includes a lithium anode, an electrolyte of an alkali metal salt dissolved in an organic solvent, and a cathode of a chromate, vanadate, molydate, permanganate, iodate, oxide, or carbonmonofluoride.

6 Claims, 3 Drawing Figures

ULTRAMINIATURE HIGH ENERGY DENSITY CELL

This is a division of application Ser. No. 664,780, filed Mar. 8, 1976, now U.S. Pat. No. 4,028,138, which is a continuation-in-part of Ser. No. 314,316 filed Dec. 12, 1972 now U.S. Pat. No. 3,945,846 issued on Mar. 23, 1976.

This invention relates to an ultraminiature, cylindrical, electrical cell utilizing a lithium anode and a high energy density cathode material to obtain the benefits of the high energy content of the elements of a cell utilizing that construction.

In U.S. Pat. No. 3,945,846 I describe an ultraminiature primary cell which is useful in many applications where space limitations make such an ultraminiature primary cell especially beneficial. The invention described therein utilizes the high energy content that can be obtained with a lithium-sulfur dioxide system. That patent was directed to construction of miniature cells and to a method of making such miniature cells having dimensions on the order of a diameter of 0.1 inch and a length of 0.75 inch. In the cells disclosed therein, advantage is taken of the high energy content that can be disposed, in this small volume, by using a lithium anode and a sulfur dioxide depolarizer electrolyte.

It has now been found that it is possible to provide an ultraminiature primary electric cell with a volume up to 0.01 inch$^3$ employing a lithium anode with a cathode material capable of providing an even higher energy density than can be obtained by the use of sulfur dioxide, and which can be made within the same small dimensions defined by the cell described in my prior patent.

In accordance with this invention there is provided a cell of these ultraminiature dimensions which provides the satisfactory kind of operation of a larger cell of the same elements, and which is made by a method that overcomes the usual difficulties of working with materials especially volatile materials, in a space of such diminutive dimensions.

One of the major problems in manufacturing any closed electric cell is encountered in sealing the cell. In the construction of a miniature cell of the dimensions here involved, the sealing problem is especially difficult. Moreover, the presence of lithium as an element or component in the cell requires that all of the assembly work be done in a dry atmosphere since the presence of any water would introduce hazardous conditions because of the extreme activity of lithium in the presence of moisture. The necessity of assembling and sealing the cell in a dry atmosphere introduces complications in the handling, the sealing and the filling operations.

The present invention provides both a design construction and a method of assembly and filling which assures the formation and maintenance of an hermetic seal, and which permits filling an already sealed cell container without destroying the seal. The resulting cell will maintain hermeticity and prevent leakage of volatile electrolyte thereby retaining the electrolyte needed for the proper performance of the cell.

In accordance with one embodiment of the invention, the ultraminiature cell is constructed with a container casing formed from thin hollow tubing on whose inner surface a porous layer of an active cathode material such as silver chromate ($Ag_2CrO_4$) is formed. The cathode layer is formed by filling the container casing with dry powdered cathode material, optionally containing suitable binder and conductive material, compacting the so disposed material, and drilling out the central core leaving behind the layer of cathode material on the inner wall of the container.

A small, elongated, cylindrical anode of lithium metal is formed around a linear, metallic hollow tube which is used as current collector, as support for the lithium, and as electrolyte fill port. The anode thus formed is enwrapped in one or more layers of thin, insulating, separator material, such as microporous polypropylene, and this assembly of anode and separator is then axially inserted into the axially disposed space within the surrounding cylindrical cathode layer.

Placement of the porous polypropylene separator inside the cathode can also be accomplished prior to anode insertion by winding the separator around a slotted mandrel, inserting the mandrel in the can, and then withdrawing the mandrel leaving the separator in place. The tension of the separator material is adequate to keep it in position on the cathode surface.

In order to facilitate manufacture of the ultraminiature cells of this invention, the outer extending end of the anode collector tube is anchored in a cell top, which may be an inert plastic septum or a glass to metal seal, prior to or during the preparation of the lithium anode. The plastic septum is essentially a grommet on the upper end of the anode tube; and the septum is sized so that it will close the outer open end of a cell case as the entire anode assembly is axially inserted into operating position in the can. Alternatively the hollow tube or needle can be joined to a metal ring by an insulative glass member or ring. The metal ring can then in turn be hermetically sealed to the cell casing.

The hollow tube serves both as the filling conduit and as an anode collector pin which supports the body of the lithium anode material, and is permanently disposed and sealed in the cell top. After the cell has been filled with the desired amount of electrolyte the input end of the hollow needle, outside of the cell, is closed off and welded at its outer end. This completes the seal for the cell.

In addition to silver chromate, other suitable active cathodic materials having high energy densities include chromates of other metals such as copper, iron, cobalt, nickel, mercury, thallium, lead and bismuth, and their dichromates, basic chromates, vanadates, molybdates, permanganates, iodates, oxides, and carbonmonofluorides $(C_xF)_n$ where $x$ is equal to or less than 4 and $n$ is a large but undetermined number of recurring $C_xF$ groups. In a presently preferred embodiment, the cathodic material is a silver chromate.

The construction of the cell, and the method of forming, sealing and filling the cell are explained in more detail in the following specification and are illustrated in the accompanying drawings in which.

Figure 3:
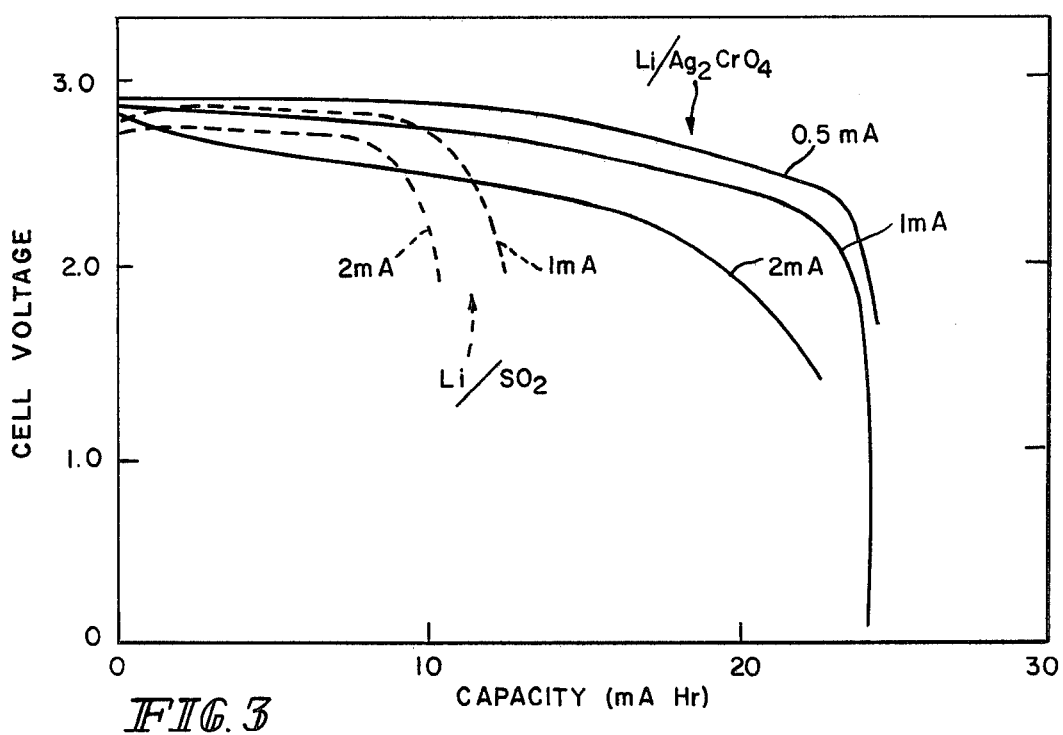

FIG. 3 is a graph showing illustrative curves of several of the cells constructed in accordance with the present invention and includes a comparison with the performance of the cells described in my aforesaid U.S. Pat. No. 3,945,846.

The general features of this invention involve the construction and the filling operation of ultraminiature cylindrical cells having a size on the order of a diameter of 0.1 inch and a length of 0.75 inch. The advantages of the cells of the invention will be understood from the energy output requirements which were set at 24 milliwatt-hours for the cells described in U.S. Pat. No. 3,945,846 but which are 45 mWHr for the present application with identical size cells and a $Ag_2CrO_4$ cathode. In both types of cells the energy output is determined at 2 to 3 volts, for currents of 2 to 3 milliamperes.

Figure 1:
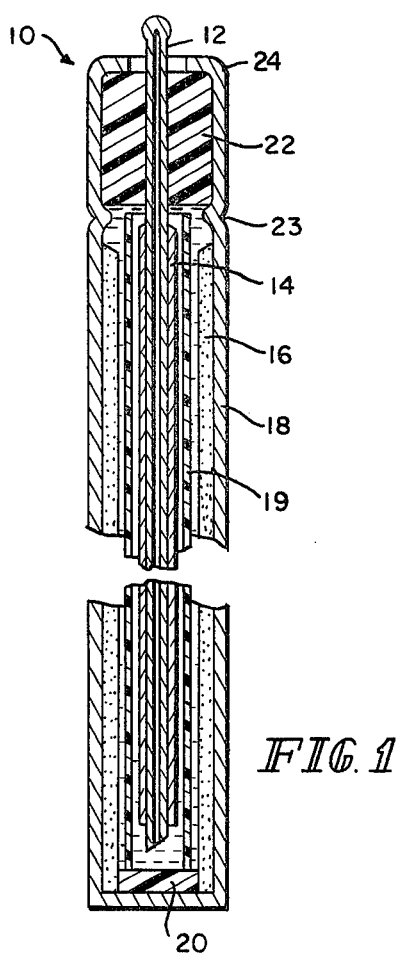
FIG. 1 is a vertical sectional view of a cell showing the general disposition of the components and elements, and a construction for filling the cell in which the cell top is a plastic septum.

The two modifications of cell design are illustrated. The first modification 10 of the cell is shown in FIG. 1, and consists of hollow tube 12 which acts as current collector for a concentric, axially disposed lithium anode 14. Tube 12 extends beyond both ends of the anode. A concentric $Ag_2CrO_4$ cathode 16 is supported on the inner wall surface of an enclosing cylindrical, stainless steel can 18, with the lithium anode 14 and the cathode 16 being separated by an insulating separator 19. The hollow tube 12 extends through plastic septum 22 which is used to seal the can before the electrolyte is introduced. The electrolyte in liquid phase is introduced into the cell by injection, as with a syringe, through the hollow tube.

The tube 12 is of greater length than anode 14 and extends completely therethrough so that a predetermined amount of electrolyte fluid can be introduced through the hollow tube 12 to exit from the bottom of said tube 12 into the operating space between the lithium anode 14 and the cathode 16. After the filling operation, the combination tube and anode collector is separated from the filling source, closed above septum 22, and sealed as shown in the operation described in the aforesaid patent.

As shown in FIG. 1, the upper, initially open end of the stainless steel container can 18 is radially peened inwardly at region 24 to tightly compress the upper portion of septum 22 so as to impose a downward clamping pressure on the upper surface of the septum. This downward pressure is counteracted by an upward pressure maintained by the bead 23 formed in the can, upon which bead the septum is seated. A polytetrafluoroethylene disc 20 insulates the bottom of anode 14 from the metal can 18.

Figure 2:
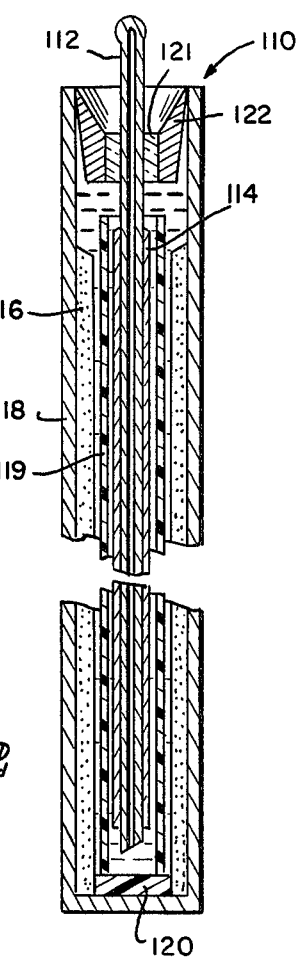
FIG. 2 is a vertical cross section of a second embodiment of the cell utilizing a glass to metal seal as the hermetic closure in place of the plastic seal shown in FIG. 1.

FIG. 2 shows another embodiment of the invention in which a glass to metal seal is used to hermetically seal cell 110 in place of the plastic septum 22 of FIG. 1. In this embodiment the upper end of the hollow tube 112 is sealed to a glass ring section 121 which is, in turn, surrounded by and sealed to metal outer ring 122. The glass to metal bonds between the glass ring 121 and both the metal tube 112 and the metal ring 122 are hermetic and do not allow any electrolyte seepage to the exterior of the cell.

The glass to metal seal is formed prior to the application of the lithium anode 114 to the tube 112. The application of the lithium to the tube is accomplished in the hereinabove described manner and the entire sub-assembly comprising tube 112 having rings 121, 122 and anode 114 secured thereto is then fitted into the cell cavity formed in the cathode, also as described above. The sub-assembly is welded to the can 118 at its upper periphery by suitable means such as electron beam or laser welding, with the weld being effected between the steel container can 118 and the metal ring 122. Filling of the cell and sealing of the tube are accomplished by the same means used for the cell in FIG. 1.

Although the cells in FIGS. 1 and 2 depict the anode as the central electrode with the lithium being secured to the hollow tube and the cathode being disposed as an inner layer on the container the positions can be reversed according to the following procedure.

A special device was designed and fabricated for molding a layer of approximately 0.005 inch thick lithium on the inner wall of a can. It comprises a turntable with a mandrel and appropriate guides to insert the mandrel into the can. The container is securely placed in a nest and a slug containing an exactly predetermined amount of lithium inserted into the can. The cell container is then positioned directly under the mandrel which is lowered into the can. The mandrel is forced into the can with sufficient force to extrude the lithium against the inside walls of the can. The mandrel is then retracted, allowing the lithium to remain on the inner wall of the can.

A pressed cathode mix, consisting of powdered material, is normally extremely friable. Two types of useful dies were designed and fabricated for molding the cathodes.

A split die can be used for the cathode molding. In this case a layer of cahode mix is first placed on one-half of the die. The hollow tube, guided by guide pins, is then placed in the die and additional cathode mix is placed on top. The die is then closed and the cathode mix is compressed around the tube. Cathodes made in this manner are fragile but it is possible to improve the adherence of the cathode to the needle by preliminarily winding a fine titanium wire or a fine mesh titanium screen around the needle and spot welding it at several places for electrical contact. Cathodes made in this manner are able to withstand handling during cell assembly.

The second, and presently preferred, type of cathode molding die for forming a central cathode member comprises a tubular cavity. The tube is positioned at the center of the cavity by means of guides and the cathode mix is extruded into the die cavity by means of a plunger. Cathodes made with this type of die are more compact and amenable to handling.

Unlike the $Li/SO_2$ cell system of U.S. Pat. No. 3,945,846, a cell system such as the above mentioned $Li/Ag_2CrO_4$ system has a solid depolarizer ($Ag_2CrO_4$) and does not cause an increase in internal pressure as the temperature is raised. The lithium anode is identical in both systems, and the electrolyte consists of a suitable salt such as $LiClO_4$ dissolved in one or a mixture of organic solvents. The postulated cell reactions are:

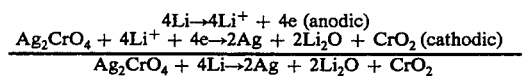

$$\frac{\begin{array}{c} 4Li \rightarrow 4Li^+ + 4e \text{ (anodic)} \\ Ag_2CrO_4 + 4Li^+ + 4e \rightarrow 2Ag + 2Li_2O + CrO_2 \text{ (cathodic)} \end{array}}{Ag_2CrO_4 + 4Li \rightarrow 2Ag + 2Li_2O + CrO_2}$$

On discharge, approximately 70% of the theoretical cathode capacity is realized above 2 volts at a current density of 1 ma/cm$^2$. The rate capability of the $Li/Ag_2CrO_4$ system is lower than that of the $Li/SO_2$ system. However, the theoretical volumetric energy density (55 whr/in$^3$) of the $Li/Ag_2CrO_4$ system is at least twice that of the $Li/SO_2$ system (22 whr/in$^3$)

Materials that are compatible with the various cell components include the following:

| Cell Component | Materials |
| --- | --- |
| Anode (eg. lithium) current collector | Steel, Ni, Cu, W, Ta, and Ti |
| Cathode (eg. $Ag_2CrO_4$) current collector | Stainless steel, Ta, Ti, Pt, and Au |
| Insulating and solvent resistant separator and sealant materials | Polyolefins (eg. polypropylene, polyethylene) and poly halogenated olefins (eg. polytetrafluoroethylene) |

Some sealant materials which are stable in the $Li/SO_2$ system may be unstable in the electrolyte of the Li-/$Ag_2CrO_4$ system. Therefore, the sealing characteristics of the $Li/Ag_2CrO_4$ cell can be improved by the use of a polyethylene or polypropylene grommet instead of the rubber top disclosed in my earlier patent.

The present system does not develop an excess pressure at ambient temperature, neither does it generate any gas on storage as do alkaline systems having zinc electrodes. Both of these features facilitate the construction of truly hermetic cells. In one specific embodiment of the invention, $Li/Ag_2CrO_4$ cells are made in stainless steel cans with an O.D. of 0.0955 inch, an I.D. of 0.0885 inch and a height of 0.75 inch (FIG. 1). Cathodes are formed on the inner walls of the steel cans by filling the cans with dry depolarizer mix comprising 86% $Ag_2CrO_4$, 9% graphite and 5% colloidal polytetrafluoroethylene by weight, and subsequently drilling out a central core in each can, leaving behind a layer of the depolarizer mix on the inner wall of each can. A polytetrafluoroethylene disc is forced to the bottom of the central core to electrically isolate the can bottoms. Lithium anodes are formed on stainless steel, hollow tube, current collectors cum electrolyte fill ports. In forming the anodes the needles are each forced through a polyethylene septum and the portion of the needles to be covered with lithium are placed in a forming tool between two layers of 0.01 inch thick lithium ribbons. These two layers are then pressed around each tube. Thereafter a layer of microporous polypropylene, as separator, is wrapped around each anode.

The assemblies are then transferred to a "dry box" and inserted into the central core of the steel cans containing the depolarizer mix. The cells are then crimped on a lathe with appropriate tools.

Organic electrolyte, comprising a 1M $LiClO_4$ solution in a mixture of propylene carbonate and tetrahydrofuran in equal volume, is introduced into the cell through the hollow tube-anode collector by means of a syringe. After the electrolyte filling, the needle terminal is sealed by tungsten inert gas (TIG) welding in the manner described in U.S. Pat. No. 3,945,846 in which a welder with a tungsten cathode is positioned just above the hollow tube end to be sealed, a gas is passed through said electrode, and, on triggering the welder, heated gas melts the tip of the tube to form a round bead of metal thus sealing the tube.

The cells formed as described above are discharged at constant currents of 0.5, 1, 1.5 and 2.0 ma. at room temperature. The open circuit voltage of the cells is approximately 3.4 volts. The average operating voltage varies from 2.4 volts to 2.7 volts depending upon the current. The cell voltage remains relatively stable above 2 volts and drops sharply at the end of discharge. In FIG. 3 typical discharge curves of the present cells are shown in comparison to the best performing Li/-$SO_2$ cells made in accordance with the procedure described in my prior patent. Discharge data for the present cells are shown in Table 1. Average energy outputs of 59 mWhr at 1 ma, 52 mWhr at 1.5 ma and 45 mWhr at 2.0 ma are achieved. This corresponds to a twofold improvement over the $Li/SO_2$ miniature cells.

TABLE I

Performance Characteristics of $Li/Ag_2CrO$ Miniature Cells

| Cell No. | Current (ma) | Average Cell Voltage | Capacity to 2 Volts (ma. hrs) | Total Energy (m.whrs) |
| --- | --- | --- | --- | --- |
| 4 | 0.5 | 2.70 | 24 | 65 |
| 3 | 1.0 | 2.60 | 23 | 60 |
| 8 | 1.0 | 2.60 | 22 | 57 |
| 9 | 1.0 | 2.65 | 23 | 60 |
| 11 | 1.0 | 2.64 | 20 | 53 |
| 17 | 1.0 | 2.66 | 22.3 | 59 |
| 12 | 1.0 | 2.65 | 23.75 | 63 |
| 22 | 1.0 | 2.64 | 23.9 | 63 |
| 16 | 1.5 | 2.56 | 19 | 48 |
| 20 | 1.5 | 2.65 | 17.25 | 46 |
| 21 | 1.5 | 2.57 | 21.6 | 55 |
| 23 | 1.5 | 2.64 | 22.2 | 58 |
| 5 | 2.0 | 2.40 | 19 | 45 |
| 13 | 2.0 | 2.53 | 18.2 | 46 |
| 15 | 2.0 | 2.47 | 17 | 42 |
| 18 | 2.0 | 2.64 | 18 | 47 |
| 19 | 2.0 | 2.57 | 18.3 | 47 |
| 39 | 1.0 | 2.65 | 23.35 | 62 |
| 31 | 2.0 | 2.58 | 17.3 | 44 |
| 32 | 1.0 | 2.60 | 22.6 | 58 |

The volumetric energy density of the $Li/Ag_2CrO_4$ miniature cell is found to be 10WHr/$in^3$ at 1 ma drain.

The $Li/Ag_2CrO_4$ system exhibited the following advantages over the $Li/SO_2$ system:

(i) The system is non-pressurized. The vapor pressure of the organic solvents is below 1 atm. at temperatures of below 80° C.

(ii) The above feature results in easier cell construction and greater reproducibility.

(iii) The packaged capacity per unit volume of the $Li/Ag_2CrO_4$ cells is greater than that of the $Li/SO_2$ cells.

(iv) The delivered energy of the miniature $Li/Ag_2CrO_4$ cells is on the order of twice that of the $Li/SO_2$ cells.

It may be concluded that the $Li/Ag_2CrO_4$ system is better suited for ultraminiature cell applications at current drains of 2 ma or less.

While the above disclosure has described the invention with reference to lithium, it will be obvious that other anode materials, such as the active metals of Groups IA and IIA, can also be used. In addition it will be recognized by those skilled in the art that many organic electrolyte solvents may be used. For example organic solvents that may be used include tetrahydrofuran, propylene carbonate, dimethyl sulfite, dimethyl sulfoxide, N-nitrosodimethylamine, gamma-butyrolactone, dimethyl carbonate, methyl formate, butyl formate, dimethoxyethane, acetonitrile and N:N dimethyl formamide, and electrolyte salts for such cells include light metal salts such as perchlorates, tetrachloroaluminates, tetrafluoborates, halides, hexafluophosphates and hexafluoarsenates. Additionally, though the described structure and method of construction refer to primary cells they are equally applicable to secondary cells.

What is claimed is:

1. An ultraminiature, electrical cell having a volume of less than about 0.01 cubic inch comprising an elongated, cylindrical metallic container open at one end thereof, a hollow metal needle combination current collector and electrode support, a container sealing means comprising said hollow metal needle having adhered thereto at its upper end means for sealing said open container end, and a layer of a first active solid electrode material adhered to said needle below said sealing means; said container having a second active solid electrode material layer on its inner surface; said electrode material providing a voltage difference therebetween; said needle being closed at its upper end and disposed axially within said container; an organic solvent disposed in said container; an alkali metal electrolyte salt dissolved in said organic solvent; and separating means between said first and second electrode active materials.

2. An ultraminiature cell as in claim 1 wherein said first active electrode material is lithium.

3. An ultraminiature cell as in claim 2 wherein said second active electrode material is a silver chromate.

4. An ultraminiature cell as in claim 3 wherein said container is comprised of stainless steel.

5. An ultraminiature cell as in claim 1 wherein said container is provided with an inwardly directed circumferential bead, said sealing means is a plastic grommet which is substantially inert to the materials within said container, and said open end of said container is crimped radially inwardly, thereby compressing said grommet against said inwardly directed bead to seal said container.

6. An ultraminiature cell as in claim 1 wherein said sealing means comprises concentric rings of glass and metal with said glass ring being interposed between and sealed to said needle and said metal ring and said metal ring is sized to fit the open end of said container and is welded to the container at its open end thereby providing an hermetic closure.

* * * * *